Sept. 24, 1935. J. C. CROWLEY 2,015,592
VALVE STEM
Filed Nov. 16, 1928
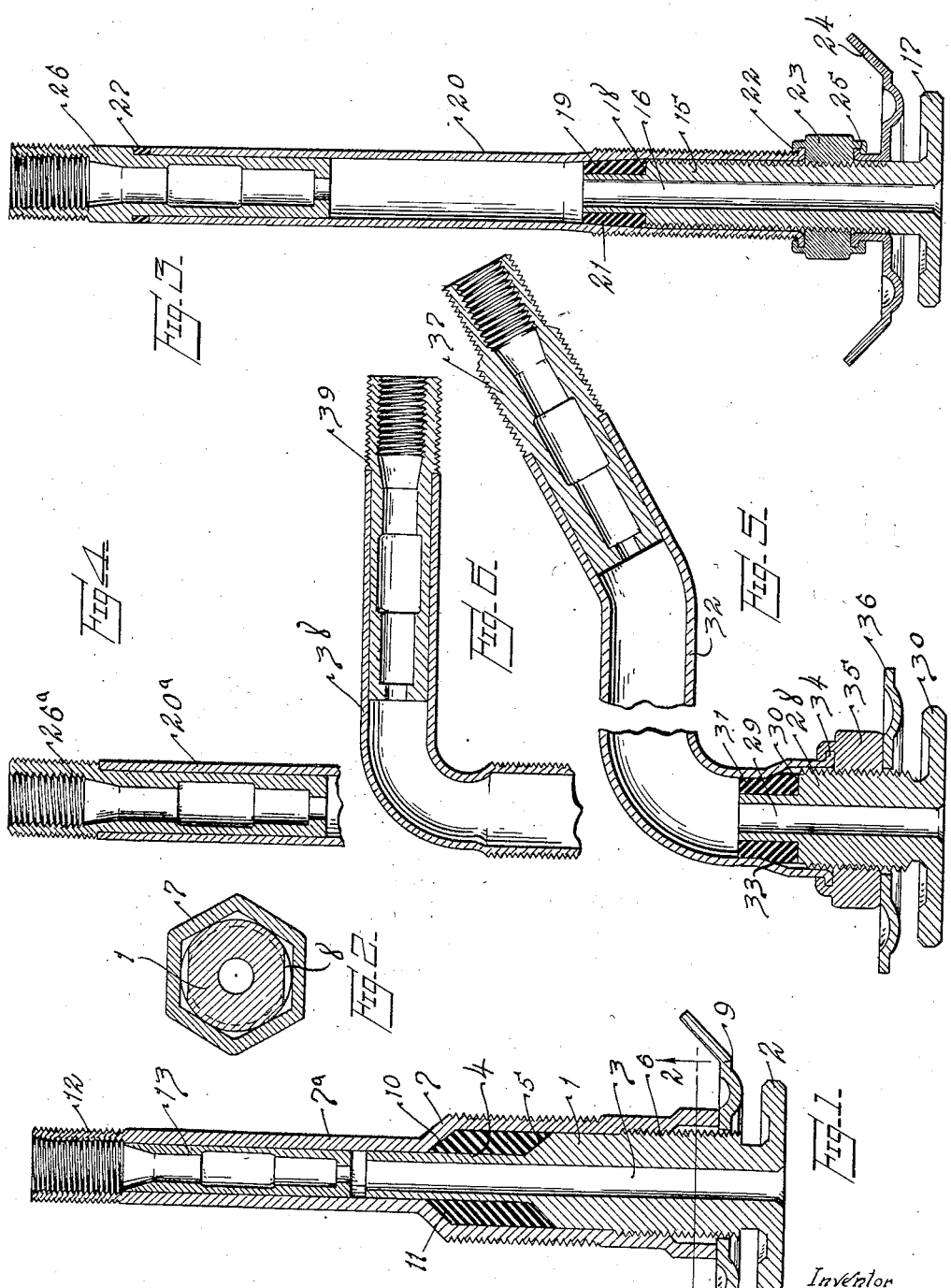

Patented Sept. 24, 1935

2,015,592

UNITED STATES PATENT OFFICE 2,015,592

VALVE STEM

John C. Crowley, Cleveland Heights, Ohio, assignor to The Dill Manufacturing Company, Cleveland, Ohio, a corporation of Ohio Application November 16, 1928, Serial No. 319,854

1 Claim. (Cl. 152—12)

This invention relates to valve stems of the type which are particularly adapted to be used in connection with pneumatic tires or devices of similar nature, where a rubber container is to be inflated.

One of the objects of the invention is to provide a construction in which a certain part of the valve stem may be made of standard construction, while the other part may be varied in its shape and length in accordance with the conditions under which it is to be used.

A further object of the invention is to provide a construction which will simplify the manufacture of valve stems, particularly of that type which require to be bent at an angle.

Reference should be had to the accompanying drawing forming a part of this specification, in which Figure 1 is a sectional elevation of a device embodying the invention.

Figure 2 is a section on the line 2—2 of Figure 1.

Figure 3 is a sectional elevation of a modified form of construction.

Figure 4 is a partial sectional elevation showing a modified construction.

Figure 5 is a sectional elevation of a modified form of construction.

Figure 6 is a partial sectional elevation of a modified form.

The present standard valve stem is made of brass and of one solid piece of metal. The use of brass is occasioned by the fact that certain parts must screw on the outside and upon the inside of the valve stem, and inasmuch as the valve stem with its parts is subject to weather conditions, necessity dictates the use of a metal which will not be subject to rust.

Certain types of valve stems, that is, those used in connection with wire wheels or in other special forms of wheels, require that the valve stem shall be bent into angular position, or at least the outer portion of the valve stem, so as to make the same accessible for inflating purposes. The various commercial requirements for angular valve stems are very extensive and there is no standard in this respect. The manufacturer, therefore, requires, if he would supply the demand, to manufacture a large variety of angular stems.

According to the present invention the valve stem is made up in a plurality of parts, and that part which is secured to the inner tube is of such nature that it may be made of standard construction, and cooperating with this part, just mentioned, tubular portions, forming the extension of the stem, may be used, and these tubular portions may be bent at any desired angle. The result of this will be that the manufacturer will only be required to carry the stem portions of the different angularities, while the part of the stem cooperating with the inner tube may be standard. This will result in a considerable reduction in cost to manufacture.

Moreover, it is entirely possible to manufacture the tubular stem of steel or some other metal, which would greatly reduce the cost of manufacture, and to use in connection therewith a part made of non-corrosive metal, which may be inserted and secured in the end of the stem, which inserted part may receive a valve structure, such, for instance, as the valve insides which is at present in use and well known.

Referring to the drawing, particularly to Figures 1 and 2, 1 indicates a member which, at one end, is provided with a head 2, and has a central bore 3. The member 1 is provided with an extension 4 of reduced diameter, thereby providing a beveled shoulder 5. This member 1, at the lower part thereof, is provided with screw threads 6.

Cooperating with the member 1 is a tubular member 7, which is of two different diameters, one portion being of sufficient diameter to fit the larger diameter of the member 1, and this member 7 at its lower end is provided with screw threads which engage with the screw threads 6. The lower portion of the member 1 is provided with flat sides, as indicated at 8 in Figure 2, and this portion of the member 1 is adapted to cooperate with a spreader 9, which has a central opening with flat sides which, as is well known, is of usual construction with spreaders. The end of the member 7 engages with the spreader 9, so that when an inner tube, or a portion of an inner tube, cooperates with the head 2 and the spreader, rotation of the member 7 will cause a clamping action with respect to the inner tube between the spreader 9 and the head 2.

The outer portion of the member 7a is of reduced diameter, and the inner diameter of the portion 7a is such as to fit over the reduced portion 4 of the member 1. The member 7 is provided with internal slanting shoulders 10, and between the slanting shoulders 10 and the slanting shoulders 5 there is positioned a packing member 11. It will be obvious that when the member 7 is screwed inwardly upon the member 1 the packing 11 is compressed so as to provide an efficient packing against the escape of air.

The outer end of the portion 7a is threaded, as indicated at 12, for the purpose of receiving a valve cap or the like. Within the portion 7a there is inserted a tubular member 13, this being secured in any desired manner. This tubular member 13 is hollow and, in the present instance, is formed in any desired manner to secure therein a valve mechanism, such for instance as a standard valve insides.

From the construction described it will be seen that there is provided what may be termed a composite valve stem, which, where desired, may have the parts thereof made of dissimilar metals. It will also be obvious that the outer member 7ᵃ need not necessarily be straight, but may be made in different forms, as, for instance, it may be given a curved form, such as shown in Figures 5 and 6. In any event it will be apparent that the member 1 may be made of standard construction for use with cooperating members, such as the member 7, in which the stem may be straight or may be curved. Therefore, in manufacture it will only be necessary to make the cooperating parts, and by this we mean the parts which cooperate with the member 1, of different shapes or lengths, while the part 1 may be of standard construction.

Referring to Figure 3, the construction there disclosed is in many respects similar to that which has been described with respect to Figure 1. The member 15 has a central bore 16 and a head 17. The exterior surface of the member 16 is threaded. At its outer end the member 15 is made of reduced diameter, thereby providing a shoulder 18, which is adapted to receive a packing member 19. Cooperating with the member 15 is the tubular member 20, which is provided with beveled shoulders 21, adapted to engage with the packing member 19. In the present instance the lower end of the member 20 is provided with an outwardly turned shoulder 22, and this is swivelly connected with a nut 23 which is adapted to be screwed upon the exterior screw threads of the member 15. As the nut 23 is screwed upon the member 15 it will draw the tubular member 20 inwardly, and so compress the packing 19, thus forming an airtight connection.

The spreader member 24 is, in the present instance, also provided with a swivel connection with the nut 23, as indicated at 25. Thus when the nut 23 is turned inwardly it not only pulls the shell 20 and the member 15 into their proper engagement, but also moves the spreader 24 into clamping action with respect to the member 17, it being understood that a portion of an inner tube is clamped between the spreader 24 and the head 17.

In the outer end of the tubular member 20 there is a member 26, which is inserted within the member 20 and secured therein in any desired manner. As shown a packing member 27 cooperates with the end of the tubular member 20 and the member 26, so as to prevent the escape of air. The member 26 is formed to receive a valve mechanism, such for instance as the standard valve insides which is at present well known.

It will be seen that with the form of construction shown in this figure the tubular portion 20 may be straight or may be bent to any desired angle such as suggested in Figures 5 and 6.

In this form of construction it will be seen that the member 15 may be made of standard construction, and this is adapted to cooperate with tubular members such as the tubular member 20, or other forms of tubular members which are bent to assume different angular forms.

In Figure 4 the tubular member 20ᵃ which corresponds to the member 20 in Figure 3, receives the member 26ᵃ which corresponds to the member 26 of Figure 3, but the use of the packing member 27 is omitted.

Referring to Figure 5, the member 28 is provided with a central bore 29 and with a head 30. The exterior of the member 28 is threaded, as clearly shown in the drawing. At the outer end of the member 28 the diameter is reduced, thereby providing a shoulder 30, which is adapted to receive a packing member 31. The tubular member 32 has at its inner end a shoulder portion 33 which is adapted to cooperate with the packing 31. The tubular member also has an outwardly extending flange 34, which has a swivel connection with a nut 35, which nut is adapted to be threaded upon the exterior of the member 28.

It will be clear that as the nut 35 is turned it will draw the shoulder 33 of the tubular member 32 against the packing 31 and thus provide an air-tight connection. The spreader 36 will be forced toward the head 30 as the nut 35 is turned and this will effect the clamping of an inner tube between the spreader 36 and the head 30. As shown in Figure 5, the tubular portion 32 is bent at an angle with respect to the axis of member 28, this being illustrative of any angular shape which the member 32 may assume. At the outer end of the tubular portion 32 is a member 37 which is secured in the end of the member 32 in any desired manner. This member 37 is formed to receive a valve mechanism, such for instance, as the standard valve insides which is so well known.

In Figure 6 the tubular member 38 is shown as bent at a right angle. This tubular member 38 may be formed to cooperate with any one of the standard members, such as the member 1, the member 15 or the member 38. The tubular member 38 at its outer end receives a member 39, which is secured in any desired manner and is so formed as to receive a valve mechanism, such for instance, as the standard valve insides at present on the market.

It is to be noted that the threaded member which acts as the attaching means between the two parts of the stem, also serves to force the spreader into contact with the inner tube.

It is obvious that changes may be made deviating from the particular structures herein shown, without departing from the spirit of the invention.

Having thus described my invention what I claim is:

A valve stem comprising two stem parts, one of said parts having an internal bore extending therethrough and being provided with a head at one end and with a reduced portion, a packing arranged on said reduced portion, the other of said parts being tubular and telescoping upon the first named part, means for receiving a valve insides arranged in one end of said second named part, a nut swivelly connected to the opposite end of said second named part and cooperating with external threads on the first named part to secure said parts together, and a spreader plate swivelly connected with said nut and movable with the second named part as a unit.

JOHN C. CROWLEY.